(12) United States Patent
Krig (10) Patent No.: US 8,225,189 B2
(45) Date of Patent: Jul. 17, 2012

(54) DATA ERROR DETECTION

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1029 days.

(21) Appl. No.: 12/071,364

(22) Filed: Feb. 20, 2008

(65) Prior Publication Data

US 2008/0229179 A1    Sep. 18, 2008

Related U.S. Application Data

(60) Provisional application No. 60/918,061, filed on Mar. 15, 2007.

(51) Int. Cl.
*G06F 11/00* (2006.01)

(52) U.S. Cl. ............... 714/819; 714/45; 726/17

(58) Field of Classification Search .............. 714/45, 714/819; 726/17
See application file for complete search history.

(56) References Cited

U.S. PATENT DOCUMENTS

| | | | |
|---|---|---|---|
| 6,101,507 A * | 8/2000 | Cane et al. ............. | 707/999.201 |
| 6,170,744 B1 * | 1/2001 | Lee et al. ............... | 235/380 |
| 6,367,012 B1 * | 4/2002 | Atkinson et al. ........ | 713/176 |
| 6,470,450 B1 * | 10/2002 | Langford et al. ....... | 713/182 |
| 7,243,236 B1 * | 7/2007 | Sibert ....................... | 713/179 |
| 7,502,971 B2 * | 3/2009 | Cohen et al. ............ | 714/45 |
| 7,797,545 B2 * | 9/2010 | Adams et al. ........... | 713/179 |
| 2004/0083366 A1 * | 4/2004 | Nachenberg et al. ... | 713/170 |
| 2006/0112266 A1 * | 5/2006 | Little et al. .............. | 713/161 |
| 2007/0074034 A1 * | 3/2007 | Adams et al. ........... | 713/176 |
| 2008/0082828 A1 * | 4/2008 | Jennings et al. ........ | 713/176 |

* cited by examiner

*Primary Examiner* — Marc Duncan

(74) *Attorney, Agent, or Firm* — Sterne, Kessler, Goldstein & Fox P.L.L.C.

(57) ABSTRACT

Systems, methods, and computer program products that can be used concurrently or alternatively to detect errors in data as well as to protect access to data are provided. Embodiments enable a coherent data set (CDS) which is a data set guaranteed to be genuine and error-free at run-time. Embodiments provide systems, methods, and computer program programs to create a CDS, identify a CDS, and verify the coherency of a data set purported to be a CDS. Embodiments further enable privileged functions which are functions that can only be accessed by a restricted set of other privileged functions. Embodiments provide systems, methods, and computer program products to create, identify, and protect access to privileged functions.

19 Claims, 12 Drawing Sheets

```
aFunction ()
{
COHERENT_SECTION_BEGIN

//
// checked code section
//

COHERENT_SECTION_END
}
```

FIG. 1

```
#define SET_SIZE *the set has a
known size typedef int Size_t;
typedef int Count_t;

typedef struct element
{
    //
    // Element may be of any
type and any size
    //
    void    *element;
    Size_t  size;

} Element_t;
```
— 202

FIG. 2A

```
typedef struct identity
{
        //
        // Arbitrary integration function used to produce the CDS Identity Integral.
        // May integrate of the element field using any arbitrary sample interval
        // such as linear, every other element, or any other repeatable sampling method.
        //
        void (*integrationFunction)(void *);

//
        // CDS Indentity - the integral solution which is an identifying mark of the set.
        //
        void *identityIntegral;

} Identity_t;
```

FIG. 2B

```
typedef struct CDS
{
        Element_t    setElements[];
        Count_t                  setCount;
        Size_t           setSize;
        Size_t
(*calculateSetSizeInUnits) (CoherentDataSet_t *);
        Identity_t   setIdentity;

} CoherentDataSet_t;
```
— 206

FIG. 2C

```
program()
{
        CoherentDataSet_t set;
        set.calculateSetSizeInUnits();
        set.setElements[0].size = sizeof("ELEMENT");
        set.setElements[0].element = (void *)"ELEMENT";
        set.setElements[1].size = 1;
        set.setElements[2].element = 0xff;
        set.setCount = 2;
        set.setSize = set->calculateSetSizeInUnits();
        set.setIdentity.identityIntegral=
        set.setIdentity.integrationFunction(&set.elementSet, set.setSize);
}
```
⎯ 208

```
aFunction ()

{
LOCKED_FUNCTION

//
// checked code section
//

```
aFunction ()
{
COHERENT_SECTION_BEGIN

LOCKED_FUNCTION

//
// checked code section
//

COHERENT_SECTION_END
}
```

DATA ERROR DETECTION

CROSS-REFERENCE TO RELATED APPLICATIONS

The present application claims the benefit of U.S. Provisional Patent Application No. 60/918,061, filed Mar. 15, 2007, which is incorporated herein by reference in its entirety.

The present application is related to U.S. patent application Ser. No. 12/071,365 filed Feb. 20, 2008, which also claims the benefit of U.S. Provisional Patent Application 60/918,061, filed Mar. 15, 2007.

BACKGROUND OF THE INVENTION

1. Field of the Invention

The present invention relates generally to trusted computing.

2. Background Art

In computer and communication systems, data may become corrupted due to a variety of errors, including accidental, malicious, and/or transmission errors. It is desirable to detect these errors and correct the data, whenever possible, or to avoid using the data, when error correction is not possible.

Further, in certain computing environments, access restriction to software components may be required. For example, access may need to be restricted to a specific, limited set of software components. As such, there is a need to detect and block unauthorized use of software components.

BRIEF SUMMARY OF THE INVENTION

Embodiments of the present invention provide systems, methods, and computer program products that can be used concurrently or alternatively to detect errors in data as well as to protect access to data. This allows data to be used only when it is error-free and/or when access thereto is authorized.

According to embodiments of the present invention, a coherent data set (CDS) refers to a data set which is guaranteed to be genuine and error-free at run-time. Embodiments of the present invention provide systems, methods, and computer program programs to create a CDS, identify a CDS, and verify the coherency/integrity of a data set purported to be a CDS.

According to embodiments of the present invention, locked software components or functions (hereinafter referred to together as "privileged functions") are functions that can only be accessed by a restricted set of other privileged functions. Embodiments of the present invention provide systems, methods, and computer program products to create, identify, and protect access to privileged functions.

According to embodiments of the present invention, a data set may include a CDS, a privileged function, or both. For example, a privileged function can be contained within a coherent data set (CDS) or vice versa.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Overview

In computer and communication systems, data and/or (executable or non-executable) code (hereinafter referred to together as "data") may become corrupted due to a variety of errors, including accidental, malicious, and/or transmission errors. It is desirable to detect these errors and correct the data, whenever possible, or to avoid using the data, when error correction is not possible. Further, in certain computing environments, access restriction to software components may be required. For example, access may need to be restricted to a specific, limited set of software components. As such, there is a need to detect and block unauthorized use of software components.

Embodiments of the present invention provide systems, methods, and computer program products that can be used concurrently or alternatively to detect errors in data as well as to protect access to data. This allows data to be used only when it is error-free and/or when access thereto is authorized.

Coherent Data Set (CDS)

According to embodiments of the present invention, a coherent data set (CDS) refers to a data set which is guaranteed to be genuine and error-free at run-time. Embodiments of the present invention provide systems, methods, and computer program programs to create a CDS, identify a CDS, and verify the coherency/integrity of a data set purported to be a CDS.

According to embodiments of the present invention, a CDS may include sequential and/or non-sequential data blocks. For example, the CDS may include a complete data block or stream or a sparse sample of the data block or stream, generated by an arbitrary sampling function, including, but not limited to, a function that performs a repeatable sampling algorithm over the data block or stream.

According to embodiments of the present invention, a CDS may be stored in a memory device of any type, including, but not limited to, volatile or non-volatile memory, persistent storage, erasable storage, and read-only memory. A CDS may further be received within a data stream over a communication channel, bus, adapter, or interface.

Figure 1:
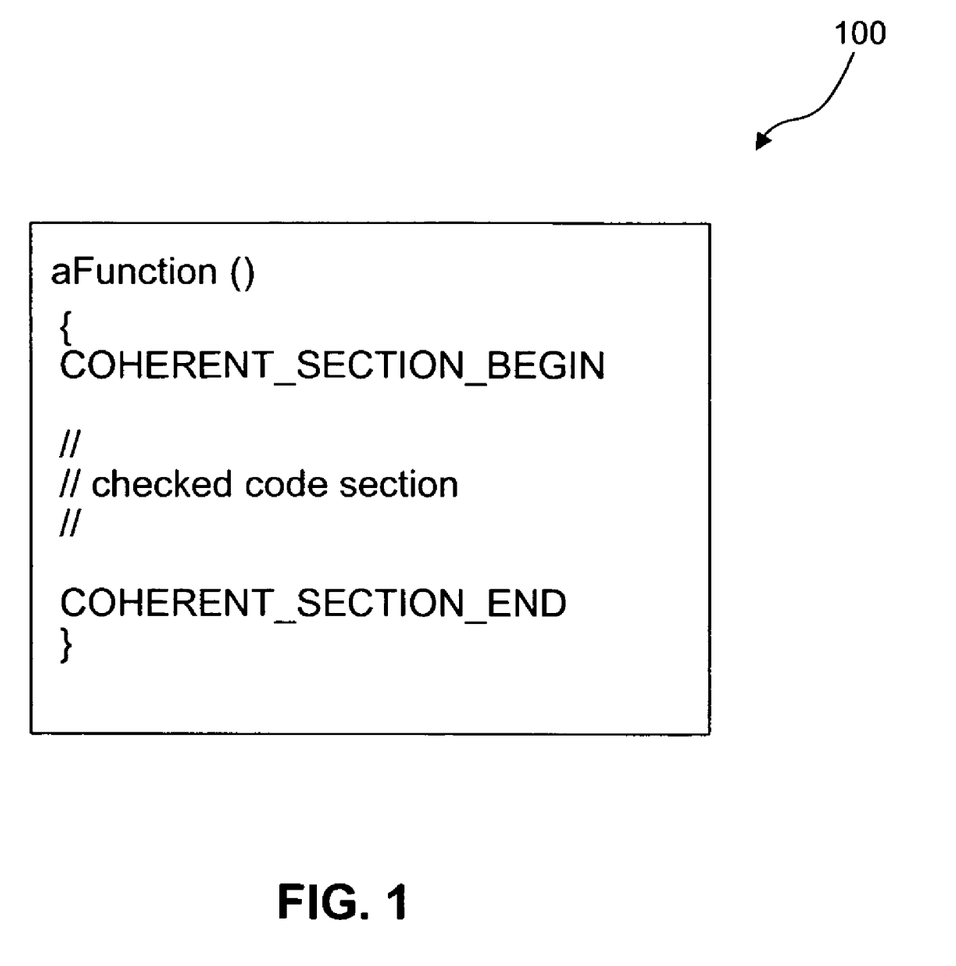
FIG. 1 illustrates an example data set that includes a coherent data set according to an embodiment of the present invention.

According to embodiments of the present invention, a CDS may be created manually and/or automatically. In an embodiment, a data set from which a CDS is to be created is marked at build-time (i.e., when the data set is developed and/or generated) using a set of MACRO statements, which define one or more CDSs within the data set. In another embodiment, the data set is run through a special build process at build-time. This allows a CDS developer to select any portion of the data set to be part of the CDS. According to this embodiment, no marking of the data set is required. FIG. 1 illustrates an example data set 100 that includes a CDS according to an embodiment of the present invention. As shown, example data set 100 is a code that includes a function, aFunction( ). The function aFunction( ) includes a CDS, which is defined and can be identified by the macro statements "COHERENT_SECTION_BEGIN" and "COHERENT_SECTION_END." In example data set 100, the CDS includes the entire body of the function aFunction( ). In other embodiments, the CDS may include one or more non-sequential portions of the function aFunction( ).

According to embodiments of the present invention, a signature is generated based on and associated with a CDS at build-time. This build-time signature is subsequently used to verify the coherency of the CDS at run-time (i.e., when the CDS is used, executed, and/or processed). The build-time signature of the CDS may be generated using any signature generation or integration function, including, but not limited to, a Cyclic Redundancy Check (CRC) function, a Longitudinal Redundancy Check (LRC) function, and a Message-Digest Algorithm 5 (MD5) function. In an embodiment, the build-time signature of the CDS is stored in a signature database, which is located, for example, in a memory device or other private location. Preferably, when stored in a memory device, the signature database is stored in read-only memory to prevent it from being tampered with.

In an embodiment, the signature generation or integration function used to generate the build-time signature of the CDS or a pointer thereto is embedded within the CDS. This allows the signature generation or integration function to be used at run-time to generate a run-time signature of the CDS. The run-time signature is compared with the build-time signature to verify the coherency of the CDS. Alternatively, the build-time signature or a memory pointer thereto is embedded within the CDS and the signature generation or integration function is stored in a private location for use at run-time.

According to embodiments of the present invention, a CDS may include one or more data elements each having a respective size and a respective data type. The number, size, and/or type of data elements within a CDS can be arbitrary. In an embodiment, a CDS further includes a count indicator of data elements within the CDS, an overall size indicator of the CDS, and a signature generation or integration function (alternatively or concurrently, the build-time signature is included instead of or together with the signature generation or integration function). In an embodiment, the signature generation or integration function is applied to the one or more data elements of the CDS to generate the build-time or run-time signature of the CDS.

Figure 2A:
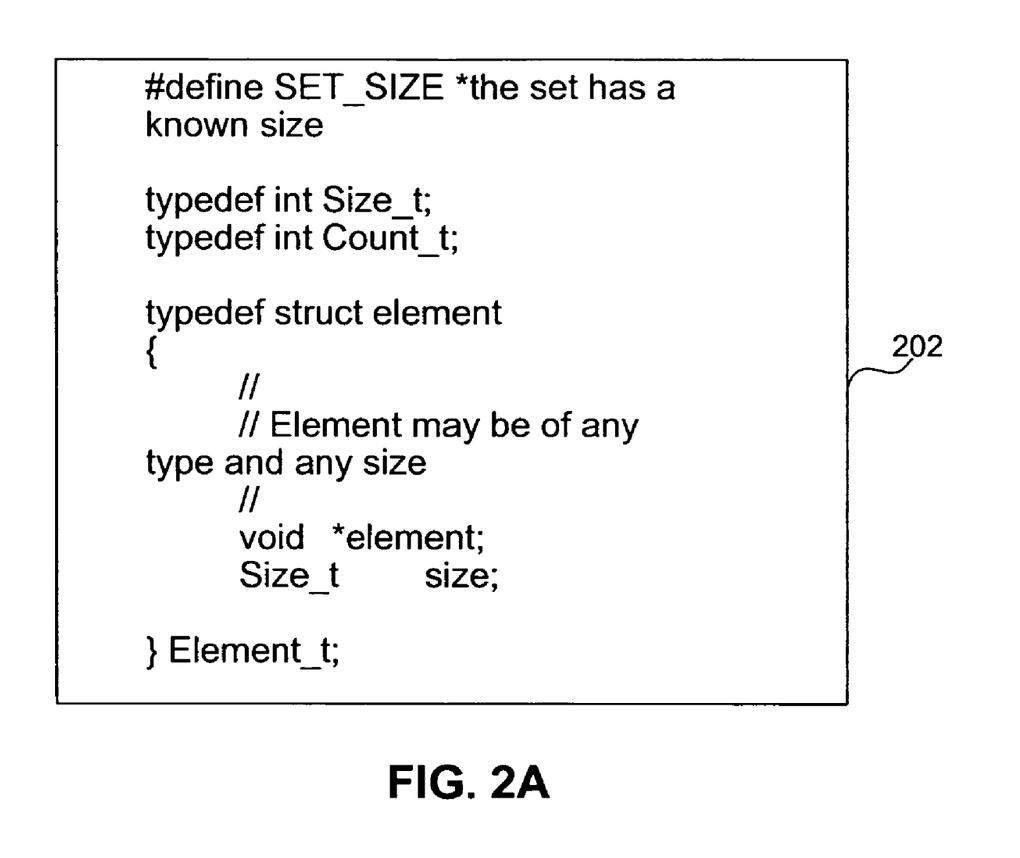
FIGS. 2A-2D illustrate example pseudo-code/code for implementing and using a coherent data set according to an embodiment of the present invention.
Figure 2B:
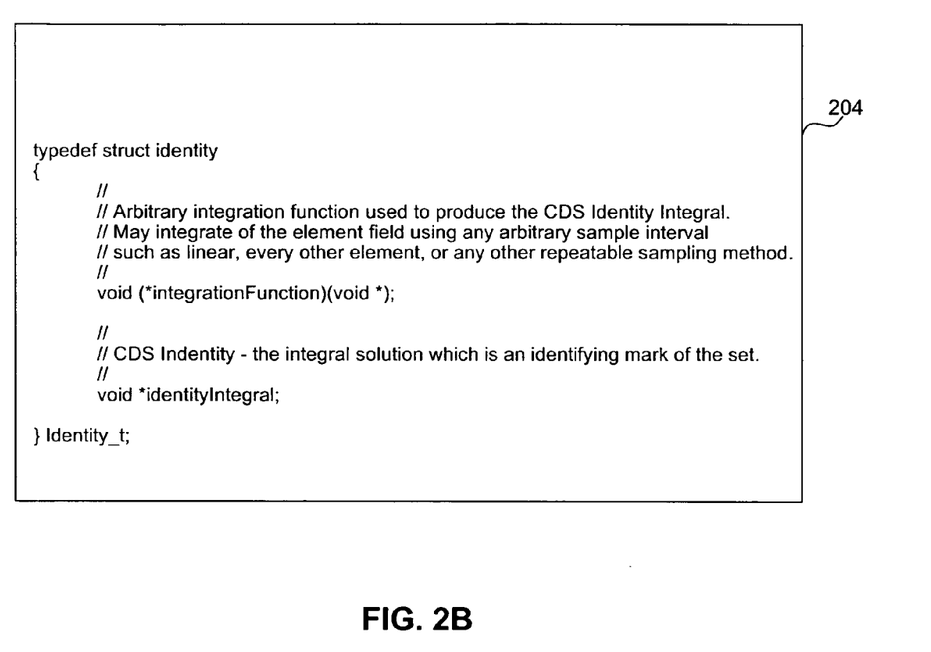
Figure 2C:
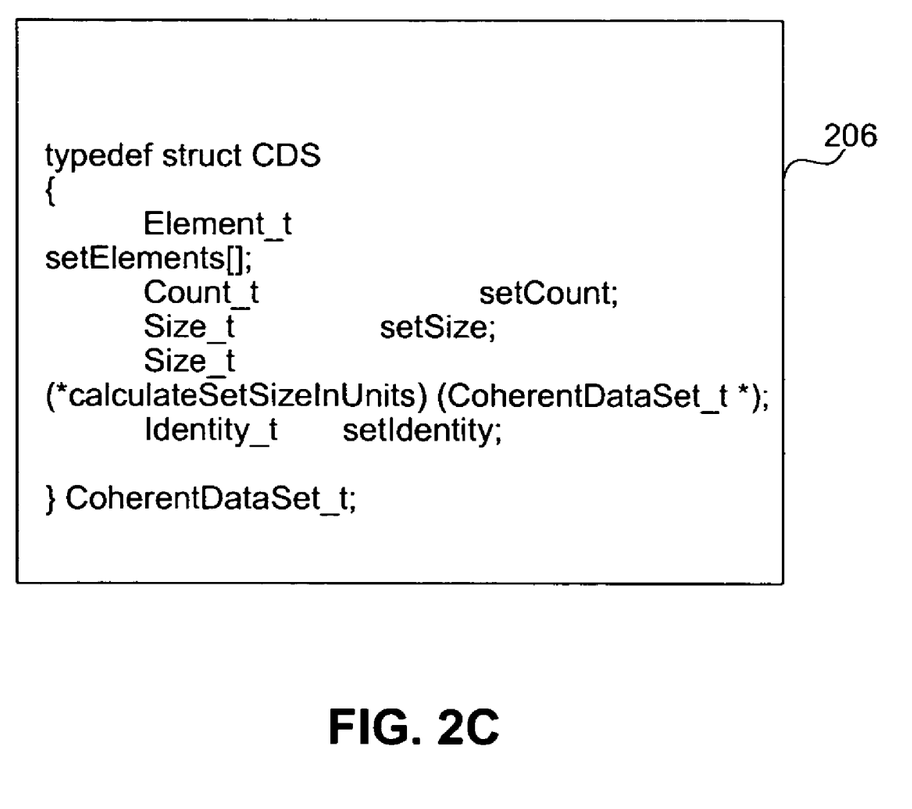

FIGS. 2A-2D illustrate example pseudo-code/code for implementing and using a coherent data set according to an embodiment of the present invention. In this example implementation, the CDS is implemented using a data structure. For example, FIG. 2C illustrates an example data structure 206 of type CoherentDataSet_t, which can be used to store/create a CDS. As shown, example structure 206 includes an Element_t type array, setElements[ ], which refers to the data elements of the CDS. The Element_t type definition is illustrated in FIG. 2A. As shown in FIG. 2A, an Element_t type includes a pointer, *element, that points to the location of the data element referenced by an Element_t type variable and a Size_t type element (which as illustrated in FIG. 2A is an integer type element), size, that indicates the size of the data element.

Referring back to FIG. 2C, example structure 206 also includes a Count_t type element (which as illustrated in FIG. 2A is an integer type element), setCount, which is used to set/get a count indicator of data elements within the CDS. Example structure 206 further includes two Size_t type elements (which as illustrated in FIG. 2A are integer type elements). The first Size_t type element, setSize, is used to set/get the overall size of the CDS. The second Size_t type element is a function which receives as input argument a pointer to a CDS and returns the overall size of the CDS as a Size_t type.

Still referring to FIG. 2C, example structure 206 further includes an Identity_t type element, setIdentity. The Identity_t type definition is illustrated in FIG. 2B. As shown in FIG. 2B, an Identity_t type includes a pointer to a function, integrationFunction, which can be any integration function that can be used to produce a signature (referred to as CDS Identity Integral in FIGS. 2A-2D) of the CDS. The integration function can be applied to any combination of the data elements of the CDS, including, for example, every data element, every other data element, or any repeatable sampling of the data elements. An Identity_t type further includes a pointer, *identityIntegral, which can be used to point to the result of the integration function (i.e., the CDS signature).

Figure 2D:
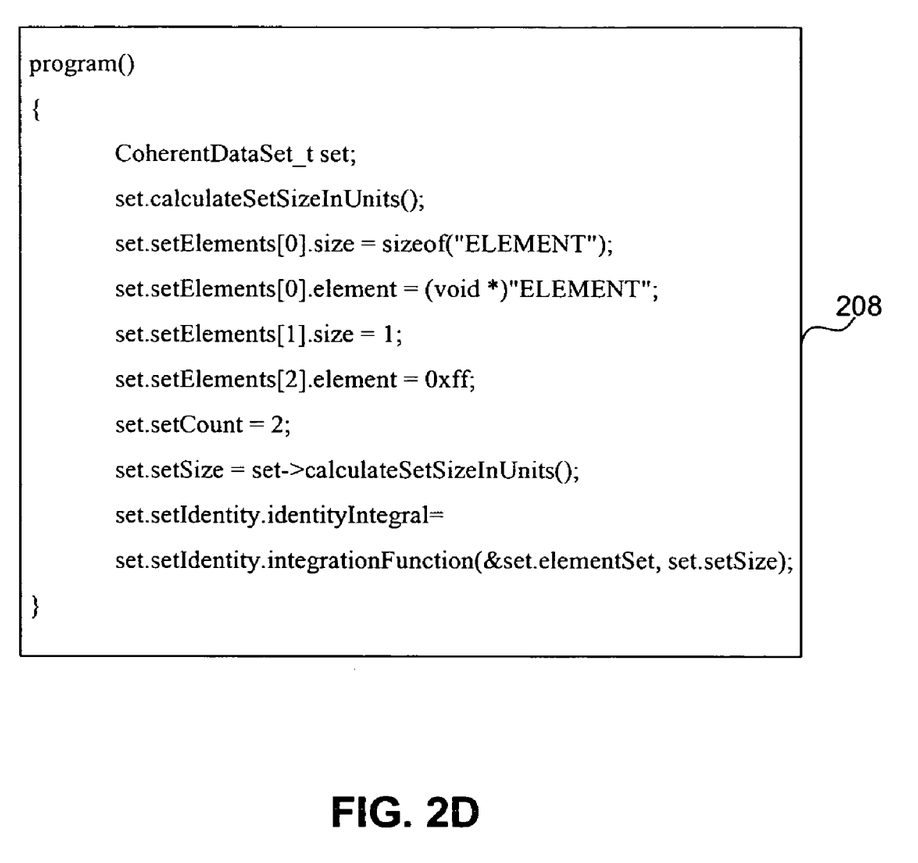

FIG. 2D is an example code 208 which illustrates the use of a CoherentDataSet_t type structure. For example, example code 208 includes syntax to set data elements (setElements) of the CDS, set the count indicator (setCount) of the CDS, and set the overall size (setSize) of the CDS. Example code 208 further includes syntax to set the pointer *identityIntegral of the setIdentity element of the CDS by calling the integration function pointed to by the *integrationFunction pointer of the setIdentity element of the CDS.

As would be understood by a person skilled in the art based on the teachings herein, FIGS. 2A-2D illustrates only an example implementation of a CDS according to embodiments of the present invention. This example implementation is provided for the purpose of illustration only and is not limiting of implementations according to the present invention. Other implementations using any combination of logic, including, but not limited to, digital hardware, software, firmware, and/or microcode, can be used according to embodiments of the present invention.

As described above, according to an embodiment of the present invention, a CDS is a data set that is identified at build-time as requiring coherency verification at run-time. An example of CDS run-time coherency verification will now be described.

Figure 3:
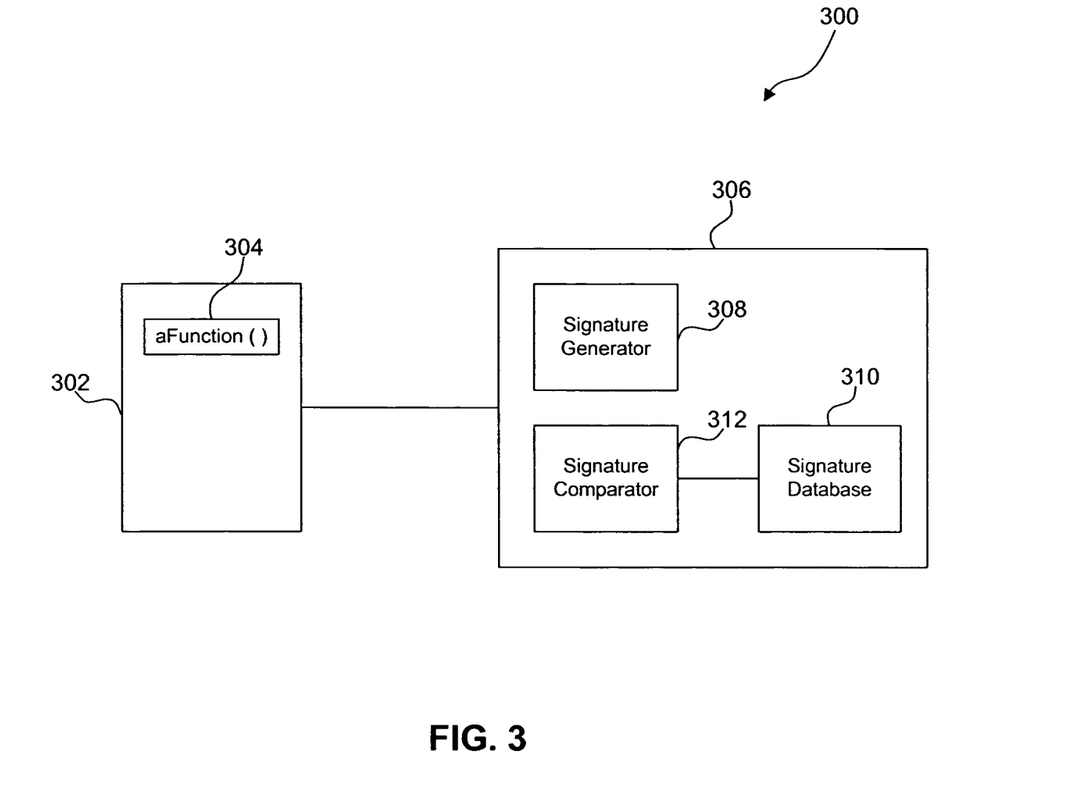
FIG. 3 is an example that illustrates data set coherency verification according to an embodiment of the present invention.

FIG. 3 is an example 300 that illustrates data set run-time coherency verification according to an embodiment of the present invention. For ease of description, example 300 is described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The functional building blocks shown in example 300 may be implemented using any combination of logic, including, but not limited to, digital hardware, software, firmware, and/or microcode. The functional building blocks shown in example 300 may be located within the same or different computer/communication systems.

Referring to FIG. 3, module 302 is an arbitrary module. Module 302 may be, for example, within a computer, portable device, etc. having a processor capable of processing data set 302. At run-time, module 302 attempts to use a data set 304. In example 300, data set 304 is a code that includes a function, aFunction( ), which purports to include a CDS. For example, the function in its entirety is a protected function and may purport be a CDS. Alternatively, sequential and/or non-sequential data sections of the function are purported to form a CDS.

As described above, a data set can be designated as a CDS by embedding an identifying macro within the data set. As such, in an embodiment, when module 302 attempts to use data set 304, the identifying macro embedded within data set 304 is detected, triggering a run-time coherency verification of the purported CDS within data set 304.

In an embodiment, coherency verification of the purported CDS of data set 304 is performed by a module 306. Module 306 may include one or more functions implemented using any combination of logic, including, but not limited to, digital hardware, software, firmware, and/or microcode. In an embodiment, module 306 includes a digital tumbler process to check for allowed call sequences. The tumbler may be created with a priori knowledge of allowable call sequences at build-time or dynamically at run-time. The digital tumbler may be implemented using Silicon.

In example 300, module 306 includes a signature generator module 308, a signature database 310, and a signature comparator 312. As would be understood by a person skilled in the art based on the teachings herein, module 306 may include more or less components/modules than illustrated in FIG. 3. Further, any component of module 306 may be implemented in other embodiments outside of module 306 or may be integrated with another component of module 306 in other embodiments.

In an embodiment, signature generator module 308 includes a signature generation or integration function, which can be used to generate a signature based on a data set. Signature generator module 308 is typically associated with the CDS on which it performs. For example, as described above with reference to FIGS. 2A-2D, the CDS may include within its structure a pointer to the signature generation or integration function. According to embodiments of the present invention, signature generator module 308 may include any signature generation or integration function, including, but not limited to, a Cyclic Redundancy Check (CRC) function, a Longitudinal Redundancy Check (LRC) function, and a Message-Digest Algorithm 5 (MD5) function.

In an embodiment, signature generator module 308 receives the purported CDS of data set 304 from module 304. For example, signature generator module 308 receives a pointers to or an actual copy of the purported CDS of data set 304, when the signature generation function of module 308 is called with the purported CDS of data set 304 as an input argument. Signature generator module 308 generates a run-time signature based on the purported CDS. Subsequently, signature generator 308 forwards the generated signature to signature comparator module 312. In an embodiment, this includes a function call to an external function that performs signature comparison. Alternatively, signature comparison is performed within the same module as signature generation.

Signature comparator 312 compares the run-time signature of the purported CDS with a build-time signature of the CDS and outputs a comparison result. As described above, the build-time signature of the CDS is generated based on and associated with the CDS at build-time. Further, the build-time signature is generated using the same signature generation or integration function as used to generate the run-time signature. In an embodiment, the build-time signature of the CDS is stored in a signature database 310, which is located, for example, in a memory device or other private location. Preferably, when stored in a memory device, signature database 310 is stored in read-only memory.

Accordingly, given that the build-time signature of the CDS is properly protected, when the run-time signature of the purported CDS matches the build-time signature of the CDS, the purported CDS is identical to the build-time designated CDS. As such, the purported CDS is a true CDS, and data contained within the CDS can be used by module 302.

On the other hand, when the run-time signature of the purported CDS does not match the build-time signature of the CDS, the purported CDS has been modified or corrupted relative to its build-time state. This may be due to, for example, accidental, malicious, and/or transmission errors. When this occurs, the data contained within the purported CDS may be discarded, the purported CDS may be re-loaded to memory to re-attempt verification, an error condition may be reported, and/or error correction of the purported CDS may be attempted.

Figure 4:
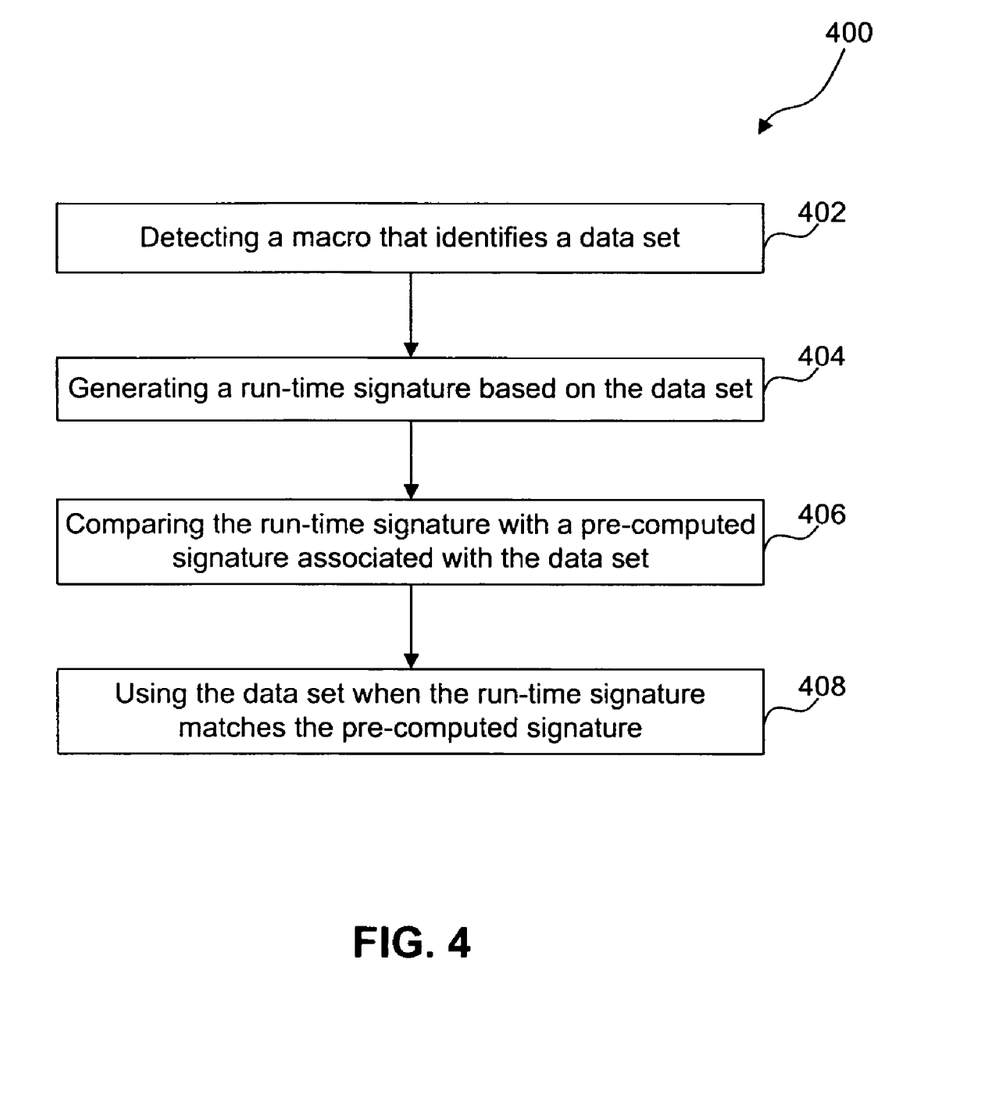
FIG. 4 is a process flowchart of a method for data error detection according to an embodiment of the present invention.

FIG. 4 is a process flowchart 400 of a method for data error detection according to an embodiment of the present invention.

Process 400 begins in step 402, which includes detecting a macro that identifies a data set. As described above, the data set may include data and/or (executable or non-executable) code. In an embodiment, the macro is embedded within the data set and is detected when the data set is attempted to be used. For example, the data set may include a protected/sensitive function that requires coherency verification prior to use. Step 402 triggers CDS coherency verification, which causes process 400 to proceed to step 404.

Step 404 includes generating a run-time signature based on the data set. As described above, step 404 is performed by a signature generation or integration function associated with the data set. In an embodiment, step 404 includes applying a signature generation or integration function to one or more data elements of the data set. For example, this includes applying or more of a Cyclic Redundancy Check (CRC) function, a Longitudinal Redundancy Check (LRC) function, and a Message-Digest Algorithm 5 (MD5) function to the one or more data elements of the data set.

Subsequently, step 406 includes comparing the run-time signature with a pre-computed signature associated with the data set. In an embodiment, the pre-computed signature is a build-time signature stored in a signature database. The signature database can be stored in a read-only memory of a computer system. Alternatively, the pre-computed signature is embedded within the data set. Step 406 further includes outputting a comparison result based on the comparison of the run-time signature and the pre-computed signature.

Process 400 includes, in step 408, using the data set when the run-time signature matches the pre-computed signature.

Process 400 may further include, when the run-time signature does not match the pre-computed signature, discarding the set, re-loading the data set to memory to re-attempt coherency verification, reporting an error condition, and/or correcting errors in the data set.

Locked Functions and Digital Combination Locks

According to embodiments of the present invention, locked software components or functions (hereinafter referred to together as "privileged functions") are functions that can only be accessed by a restricted set of other privileged functions. Embodiments of the present invention provide systems, methods, and computer program products to create, identify, and protect access to privileged functions.

According to embodiments of the present invention, privileged functions are determined and created at build-time and stored in a private location at run-time. Typically, privileged functions are not made publicly available or known. Privileged functions may include sensitive functions within a computer program product. For example, privileged functions may include Digital Rights Management (DRM) library functions, which must remain protected from unauthorized use at the risk of causing legal copyright issues for the developer of the computer program product.

Figure 5:
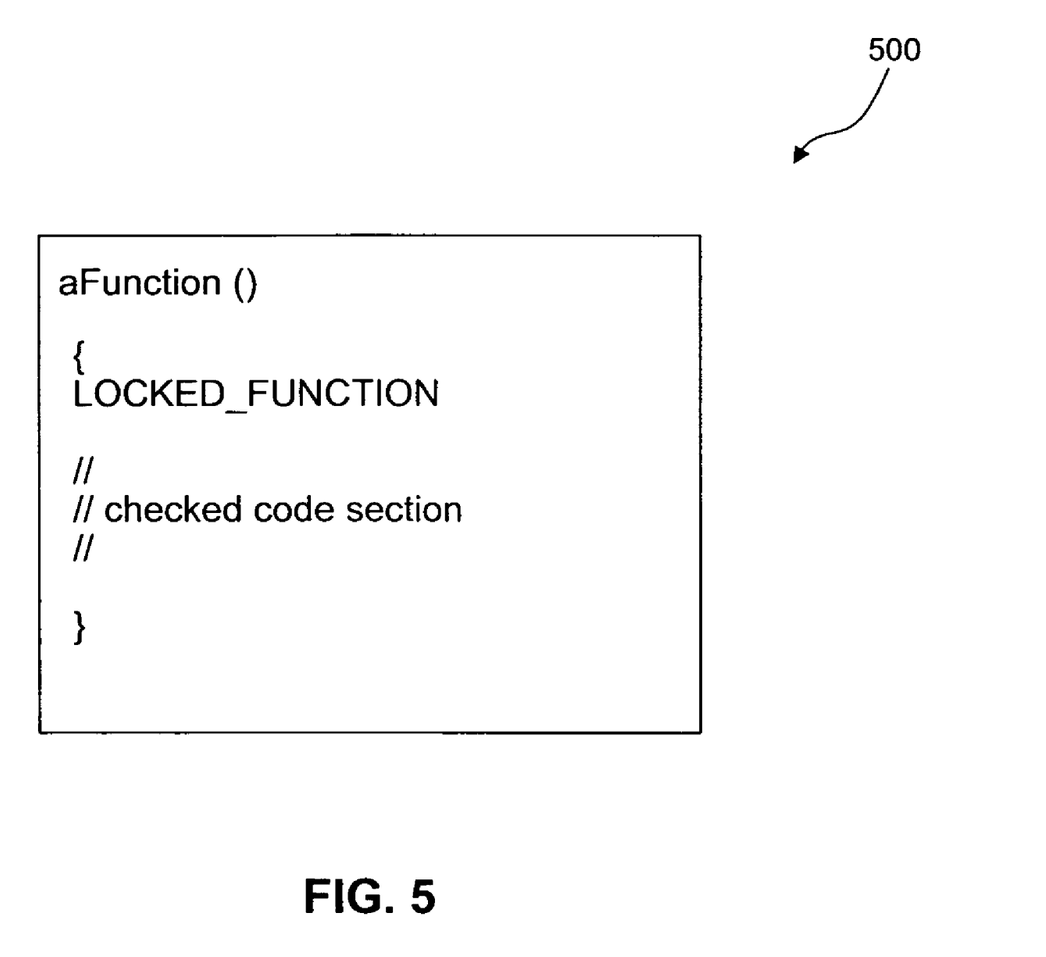
FIG. 5 illustrates an example data set that includes a locked function according to an embodiment of the present invention.

According to embodiments of the present invention, a privileged function may be created manually and/or automatically. In an embodiment, a privileged function is marked at build-time using a set of MACRO statements. For example, FIG. 5 illustrates a code 500 having a function aFunction( ) marked by the macro LOCKED_FUNCTION to identify it as a privileged function. In another embodiment, the privileged function is run through a special build process at build-time. According to this embodiment, no marking of the privileged function is required.

Figure 6:
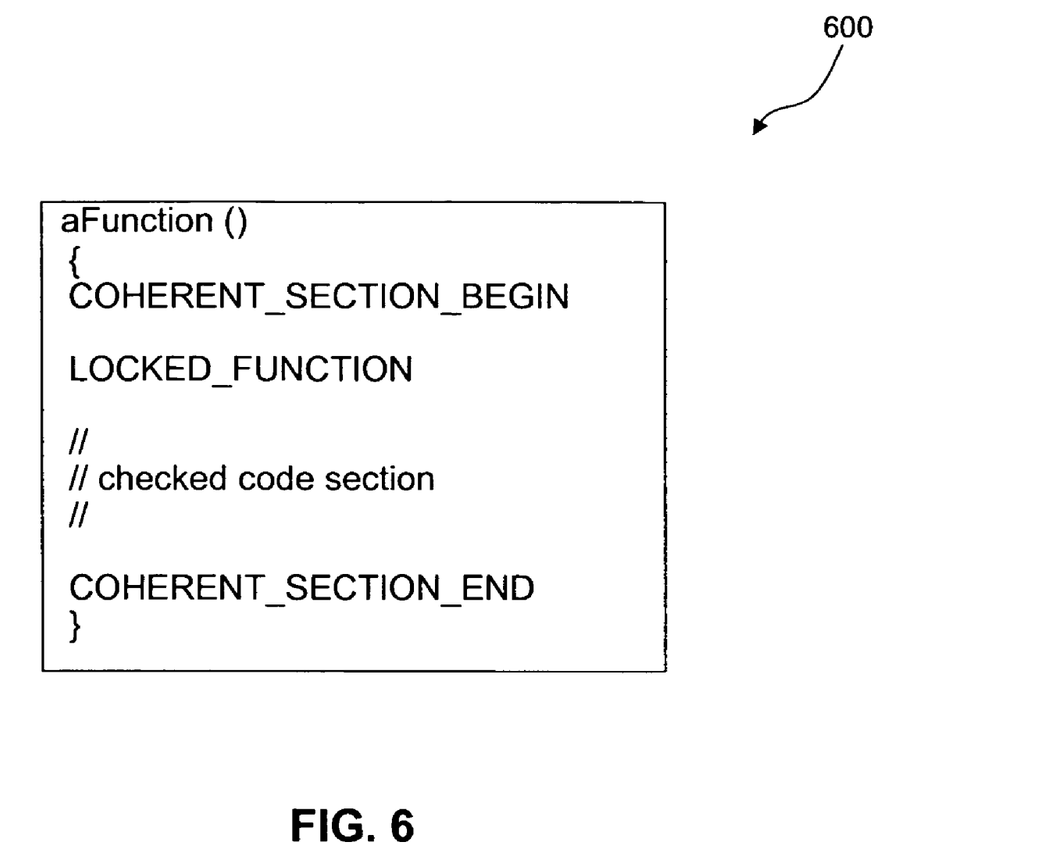
FIG. 6 illustrates an example data set that includes a coherent data set, which further includes a locked function, according to an embodiment of the present invention.

According to embodiments of the present invention, a privileged function can be contained within a coherent data set (CDS) or vice versa. FIG. 6 illustrates, for example, a code 600 having a function that includes a CDS, which in turn includes a privileged function. As such, when the function is called, it is checked for both coherency and access restriction.

According to embodiments of the present invention, a privileged function may only be called and used by other privileged functions. Alternatively or additionally, a privileged function can only be called and accessed if the privileged function call conforms with at least one of one or more valid call sequences of privileges function. In an embodiment, valid call sequences of privileges functions are determined at build-time and stored in a private location at run-time, preferably in a read-only memory when stored in a memory device.

Figure 7:
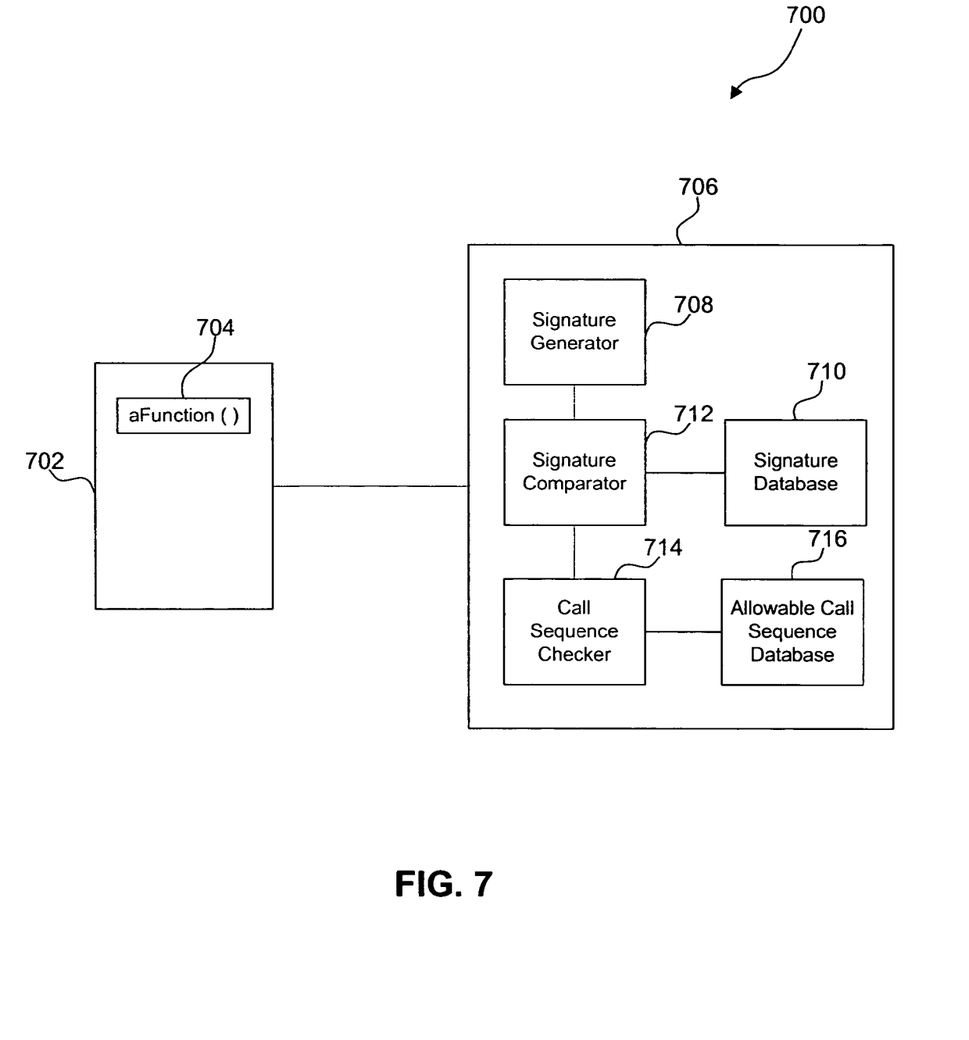
FIG. 7 is an example that illustrates access protection to privileged functions according to an embodiment of the present invention.

FIG. 7 is an example 700 that illustrates access protection to privileged functions according to an embodiment of the present invention. For ease of description, example 700 is described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The functional building blocks shown in example 700 may be implemented using any combination of logic, including, but not limited to, digital hardware, software, firmware, and/or microcode. The functional building blocks shown in example 700 may be located within the same or different computer/communication systems.

In example 700, function 702 calls and attempts to use function 704 aFunction( ), which is a privileged function. This triggers a run-time check of the access privileges of function 702. In an embodiment, the run-time access check includes determining whether function 702 is a privileged function. In another embodiment, the run-time access check, alternatively or additionally, includes determining whether the function call to function 704 conforms with at least one of one or more valid call sequences of privileged functions. In another embodiment, the run-time access check includes determining whether the return address of the function call to function 704 conforms with at least one of or more valid return address sequences associated with valid call sequences of privileged functions. For example, the one or more valid return address sequences include sequences of return addresses of privileged functions that correspond to valid call sequences of privileged functions.

In example 700, the run-time access check is performed by a verification module 706. Verification module 706 may include one or more functions implemented using any combination of logic, including, but not limited to, digital hardware, software, firmware, and/or microcode. In an embodiment, verification module 706 includes a digital tumbler process to check for allowed call sequences. The digital tumbler may be created with a priori knowledge of allowable call sequences or return address sequences at build-time or dynamically at run-time. The digital tumbler may be implemented using Silicon.

In example 700, verification module 706 includes a signature generator module 708, a signature database 710, and a signature comparator 712, a call sequence checker 714, and a valid call sequence database 716. Alternatively or additionally, verification module 706 may include a valid return address sequence database. As would be understood by a person skilled in the art based on the teachings herein, module 706 may include more or less components/modules than illustrated in FIG. 7. Further, any component of module 706 may be implemented in other embodiments outside of verification module 706 or may be integrated with another component of verification module 706 in other embodiments.

In an embodiment, signature generator module 708 includes a signature generation function. According to embodiments of the present invention, signature generator module 708 may include any signature generation function, including, but not limited to, a Cyclic Redundancy Check (CRC) function, a Longitudinal Redundancy Check (LRC) function, and a Message-Digest Algorithm 5 (MD5) function.

In an embodiment, signature generation module 708 generates a run-time signature of function 702. In an embodiment, signature generator module 708 generates the run-time signature based on the start memory address and the end memory address of function 702. This ensures that any function in memory will have a unique signature.

Signature generator 708 forwards the generated signature of function 702 to signature comparator module 712. In an embodiment, this includes a function call to an external function that performs signature comparison. Alternatively, signature comparison is performed within the same module as signature generation.

Signature comparator 712 compares the run-time generated signature of function 702 with a list of signatures each associated with a respective privileged function. In an embodiment, the list of signatures is created at build-time based on each of the privileged functions, using the same signature generation function used at run-time by signature generator module 706. The privileged functions' signatures are stored at run-time in a signature database 710. Signature database 710 can be located, for example, in a memory device or other private location. Preferably, when stored in a memory device, signature database 710 is stored in read-only memory to prevent the insertion/removal of a function signature, which can be subsequently used to call and access privileged functions.

According to embodiments of the present invention, the run-time access check includes only determining whether the signature of the calling function matches the signature of a privileged function. Accordingly, given that the signature database is properly protected, when the run-time signature of function 702 matches any signature in signature database 710, function 702 is a privileged function which is granted access to privileged function 704. On the other hand, if the run-time signature of function 702 does not match any signature in signature database 710, function 702 is not a privileged function and is denied access to privileged function 704.

According to further embodiments of the present invention, the run-time access check further includes, in addition to signature checking, determining whether the function call to the privileged function conforms with at least one of one or more valid call sequences of privileged functions. This ensures not only that the calling function is privileged but also that the privileged functions are used in a pre-determined and appropriate manner. As such, even if a privileged function becomes compromised, the privileged functions cannot be used inappropriately. This is analogous to a digital combination lock over the privileged functions.

In an embodiment, call sequence checking is only performed after the calling function is determined to be a privileged function. In an embodiment, as illustrated in FIG. 7, call sequence checking is performed by call sequence checker 714. Call sequence checker 714 uses valid call sequence database 716, which contains a list of all valid call sequences of privileged functions. Valid call sequences of privileged functions are determined and created at build-time. In an embodiment, database 716 is stored in a memory device, preferably a read-only memory. Call sequence checker 714 may further maintain a run-time log of privileged functions' calls, which it checks against the list of valid call sequences to determine whether a privileged function call conforms with at least one of the valid call sequences. In an embodiment, call sequence checker 714 determines a current state of a current call sequence of privileged functions based on the run-time log and then determines whether the privileged function call corresponds to a valid subsequent state based on the current call sequence and the valid call sequences of privileged functions. The run-time log of privileged functions' calls is preferably also stored in read-only memory to prevent it from being tampered with. Alternatively or additionally, call sequence checking is replaced or complemented with return address sequence checking, which includes checking whether a current return address sequence associated with current calls to privileged functions conforms with at least one of or more valid return address sequences.

Figure 8:
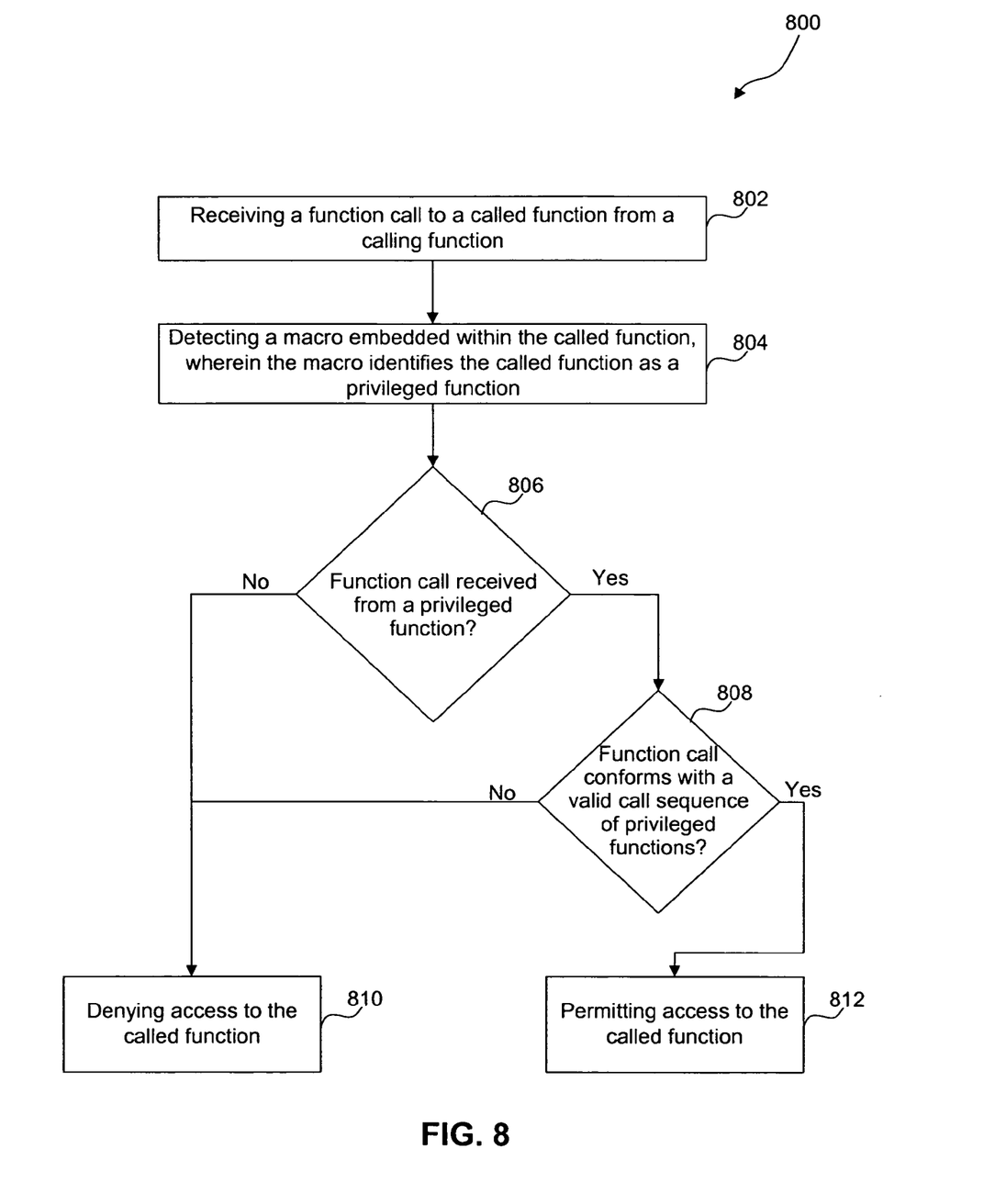
FIG. 8 is a process flowchart of a method for protecting access to privileged functions according to an embodiment of the present invention.

FIG. 8 is a process flowchart 800 of a method for protecting access to privileged functions according to an embodiment of the present invention. Process 800 begins in step 802, which includes receiving a function call to a called function from a calling function.

Step 804 includes detecting a macro embedded within the called function, wherein the macro identifies the called function as a privileged function.

Step 804 triggers a run-time access check, which includes, in step 806, determining whether the function call is received from a privileged function. In an embodiment, step 806 further includes calling a verification module from the called function, generating a signature based on the calling function, and comparing the generated signature with a set of pre-computed signatures each associated with a respective one of a set of privileged functions. In an embodiment, the generated signature is calculated based on a start memory address and an end memory address of the calling function. In an embodiment, the set of privileged functions is determined at build-time and stored in a private memory location at run-time.

If the generated signature does not match any of the pre-computed signatures, process 800 proceeds to step 810, which includes denying access to the called function. On the other hand, if the generated signature matches one of the pre-computed signatures, the function call is received from a privileged function, and process 800 proceeds to step 808, which includes determining whether the function call conforms with at least one of the valid call sequences of privileged functions. In an alternative embodiment, process 800 proceeds directly to step 812 when the function call is received from a privileged function.

In an embodiment, step 808 includes determining a current state of a current call sequence of privileged functions and determining whether the function call corresponds to a valid subsequent state based on the current call sequence and the valid call sequences of privileged functions.

If the function call conforms with at least one of the valid sequences of privileged functions in step 808, process 800 proceeds to step 812, which includes permitting access to the called function. On the other hand, if the function does not conform with any of the valid sequences of privileged functions in step 808, process 800 proceeds to step 810 to deny access to the called function.

Example Computer System Implementation

The present invention may be implemented using hardware, software or a combination thereof and may be implemented in one or more computer systems or other processing systems.

Figure 9:
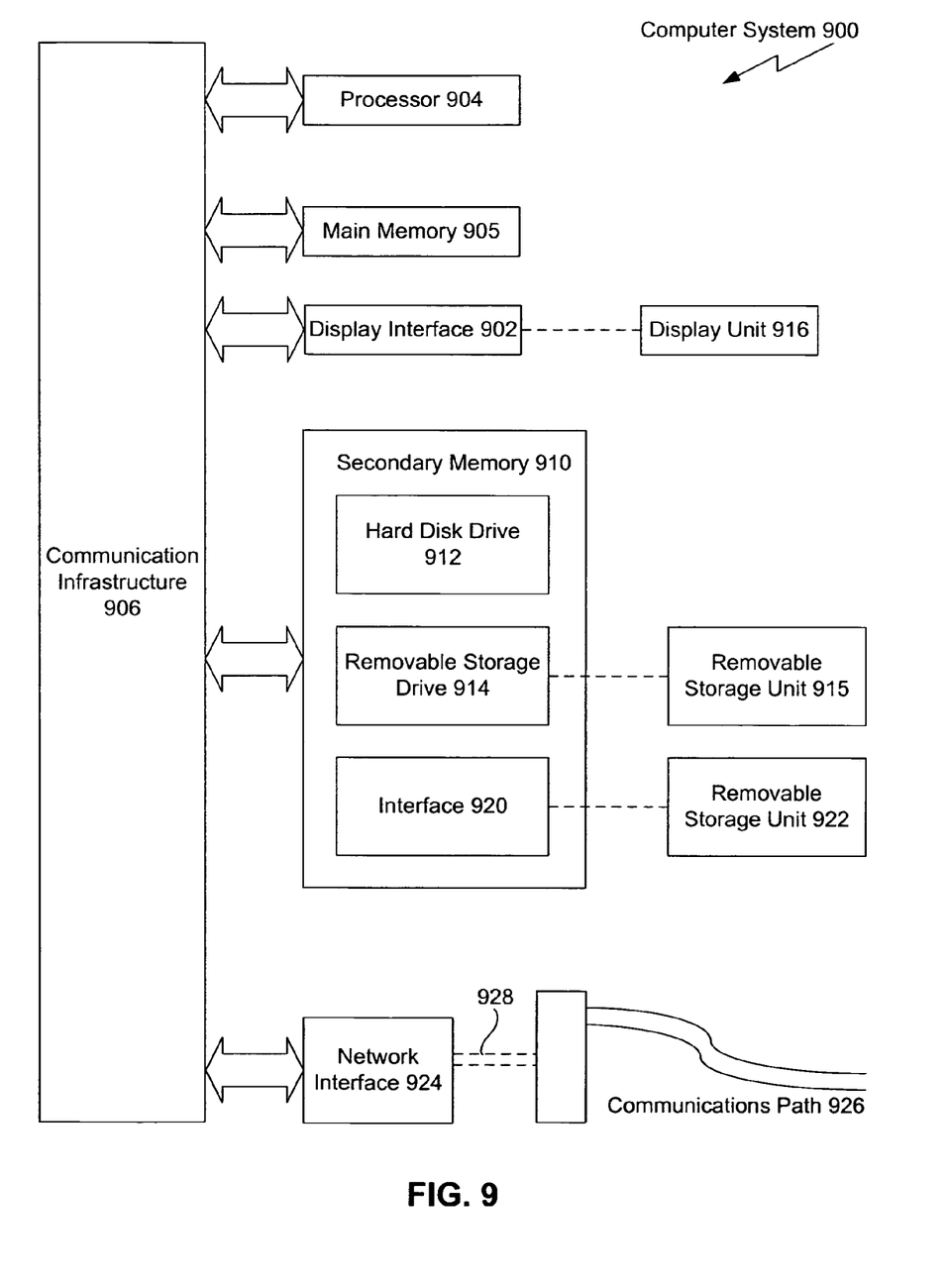
FIG. 9 is an example computer system useful for implementing components of the present invention.

An example computer system 900 useful for implementing components of the present invention is shown in FIG. 9.

Computer system 900 includes one or more processors, such as processor 904. Processor 904 is connected to a communication infrastructure 906 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from communication infrastructure 906 (or from a frame buffer not shown) for display on display unit 916.

Computer system 900 also includes a main memory 905, preferably random access memory (RAM), and may also include a secondary memory 910. Secondary memory 910 may include, for example, a hard disk drive 912 and/or a removable storage drive 914, representing a floppy disk drive, a magnetic tape drive, an optical disk drive, etc. Removable storage drive 914 reads from and/or writes to a removable storage unit 915 in a well known manner. Removable storage unit 915 represents a floppy disk, magnetic tape, optical disk, etc. which is read by and written to by removable storage drive 914. As will be appreciated, removable storage unit 915 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 915 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 915 and interfaces 920, which allow software and data to be transferred from removable storage unit 915 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900.

Computer programs (also referred to as computer control logic) are stored in main memory 905 and/or secondary memory 910. Computer programs may also be received via communications interface 924. Such computer programs, when executed, enable computer system 900 to perform the features of the present invention, as discussed herein. In particular, the computer programs, when executed, enable processor 904 to perform the features of the present invention. Accordingly, such computer programs represent controllers of computer system 900.

In an embodiment where the invention is implemented using software, the software may be stored in a computer program product and loaded into computer system 900 using removable storage drive 914, hard drive 912 or communications interface 924. The control logic (software), when executed by processor 904, causes processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for data error detection in a computer system, comprising:
   (a) detecting a macro that identifies a data set as error-free, wherein the data set comprises a signature generation function;
   (b) generating a run-time signature based on the data set using the signature generation function;
   (c) comparing the run-time signature with a pre-computed signature associated with the data set; and
   (d) using the data set when the run-time signature matches the pre-computed signature.

2. The method of claim 1, wherein the run-time signature does not match the pre-computed signature, the method further comprising one or more of:
   (e) discarding the data set;
   (f) re-loading the data set to memory;
   (g) reporting an error condition; and
   (h) correcting errors in the data set.

3. The method of claim 1, wherein the macro is embedded within the data set.

4. The method of claim 1, wherein the data set comprises one or more of code and data.

5. The method of claim 1, wherein the data set comprises a protected function, wherein steps (b) and (c) are triggered when the protected function is called.

6. The method of claim 1, wherein the data set comprises one or more data elements each having a respective size and a respective data type.

7. The method of claim 1, wherein the data set comprises at least one of the pre-computed signature and a memory pointer to the pre-computed signature.

8. The method of claim 1, wherein the data set is stored in a memory device of the computer system.

9. The method of claim 1, wherein the data set is received within a data stream, received by the computer system over a communication channel.

10. The method of claim 1, wherein the data set comprises at least one of sequential and non-sequential data blocks.

11. The method of claim 1, further comprising:
   (e) applying the signature generation function to the data set.

12. The method of claim 11, wherein step (e) comprises applying one or more of a Cyclic Redundancy Check (CRC) function, a Longitudinal Redundancy Check (LRC) function, and a Message-Digest Algorithm 5 (MD5) function to the data set.

13. The method of claim 1, wherein the pre-computed signature is stored in a read-only memory of the computer system.

14. The method of claim 1, wherein the pre-computed signature is stored in a signature database.

15. A computer program product comprising a non-transitory computer useable medium having computer program logic recorded thereon for enabling a processor to detect data errors in a data set, the computer program logic comprising:

means for enabling a processor to detect a macro that identifies a data set as error-free, wherein the data set comprises a signature generation function;
   means for enabling a processor to generate a run-time signature based on the data set using the signature generation function; and
   means for enabling a processor to compare the run-time signature with a pre-computed signature associated with the data set;
   wherein the data set is data error-free when the run-time signature matches the pre-computed signature.

16. The computer program product of claim 15, wherein the macro is embedded within the data set.

17. The computer program product of claim 15, wherein the data set comprises one or more of code and data.

18. The computer program product of claim 15, further comprising:
   means for enabling a processor to apply the signature generation function to the data set.

19. The computer program product of claim 18, wherein said means for enabling a processor to apply the signature generation function comprises means for enabling a processor to apply one or more of a Cyclic Redundancy Check (CRC) function, a Longitudinal Redundancy Check (LRC) function, and a Message-Digest Algorithm 5 (MD5) function to the data set.

* * * * *